United States Patent [19]
Jensen

[11] Patent Number: 5,959,291
[45] Date of Patent: Sep. 28, 1999

[54] METHOD AND APPARATUS FOR MEASURING LOW POWER SIGNALS

[75] Inventor: Morten J. Jensen, San Francisco, Calif.

[73] Assignee: Caliper Technologies Corporation, Mountain View, Calif.

[21] Appl. No.: 09/104,813

[22] Filed: Jun. 25, 1998

Related U.S. Application Data

[60] Provisional application No. 60/051,102, Jun. 27, 1997.

[51] Int. Cl.$^6$ .................................. G01V 9/04; G01J 1/44
[52] U.S. Cl. .................................. 250/214 R; 250/214 A; 250/214 B; 356/215
[58] Field of Search ........................... 250/214 R, 214 A, 250/214.1; 327/514; 356/215, 218, 221

[56] References Cited

U.S. PATENT DOCUMENTS

| | | | |
|---|---|---|---|
| 3,770,967 | 11/1973 | Hanna et al. . | |
| 3,770,968 | 11/1973 | Hession et al. . | |
| 4,084,905 | 4/1978 | Schreiber et al. . | |
| 4,683,579 | 7/1987 | Wardlaw . | |
| 5,036,187 | 7/1991 | Yoshida et al. | 250/214 B |
| 5,233,180 | 8/1993 | Tsuruta et al. | 250/214 A |
| 5,307,145 | 4/1994 | Schenkel et al. | 250/214 A |
| 5,754,056 | 5/1998 | Sauer . | |

FOREIGN PATENT DOCUMENTS

WO 98/11427   3/1998   WIPO .

OTHER PUBLICATIONS

J.M. Beach & B.R. Duling, vol. 172, Part 1, Journal of Microscopy (Oct. 1993) pp. 41–48 "A Light–Emitting Diode Light Standard For Photo And Videomicroscopy".

Alfredo E. Bruno et al. vol. 13 Trends In Analytical Chemistry, No. 5 (1994) pp. 190–198 "The Pigtailing Approach To Optical Detection In Capillary Electrophoresis".

Ulrich Schreiber et al. Vol. 46 Rev. Sci. Instrum., No. 5 (May 1975) pp. 538–542 "Portable Solid State Fluorometer For The Measurement Of Chlorophyll Fluorescence Induction In Plants".

Wei Tong & Edward S. Yeung, 718 Journal Of Chromatography A (1995) pp. 177–185 "Single Double–Beam Absorption Detection Systems For Capillary Electrophoresis Based On Diode Lasers And Light Emitting Diodes".

*Primary Examiner*—Stephone Allen
*Attorney, Agent, or Firm*—Townsend and Townsend and Crew

[57] ABSTRACT

A method and apparatus for measuring very low light signals including integrating a signal from a photo diode, avalanche photo diode, photomultiplier tube or the like, digitally sampling the integrator output more than two times during each integration period, fitting a curve to the multiple digitized readings to calculate the integration slope for each integration period and determining the original signal from the calculated integration slope.

31 Claims, 5 Drawing Sheets

METHOD AND APPARATUS FOR MEASURING LOW POWER SIGNALS

CROSS REFERENCE TO RELATED APPLICATIONS

This application is a continuation of U.S. Pat. application Ser. No. 60/051,102, filed Jun. 27, 1997, the disclosure of which is hereby incorporated by reference in its entirety.

BACKGROUND OF THE INVENTION

This application relates in general to measurement and sensing of low power signals. More particularly, the invention relates to the sensing, amplification and measurement of a low power, light-based signal.

FIG. 1 illustrates a circuit 100 of the prior art for amplifying a signal from a photo diode 130. The circuit of FIG. 1 includes the photo diode 130 connected across the inputs of an operational amplifier 120. The positive input of the op amp 120 is tied to ground. A resistive load R 150 is coupled between the negative terminal and the out signal 110 of the op amp 120.

Notably, the feedback resistor R 150 has inherent thermal noise that can sometimes exceed the actual signal from the photo diode 130. The output from a resistive feedback amplifier such as circuit 100 is given in equation (1) below:

$$V_{out} = -i\,R \qquad 1$$

where $V_{out}$ is in volts, i is the input signal in amperes from a signal source (such as photo diode 130) and R is the feedback resistance (such as the resistor R 150) in ohms.

A component with resistance generates thermal noise with the following RMS values:

$$V_{RMS_{noise}} = \sqrt{4kTBR} \qquad 2$$

$$I_{RMS_{noise}} = \sqrt{4kT\frac{B}{R}} \qquad 3$$

where $V_{RMS\ noise}$ is in volts and $I_{RMS\ noise}$ is in amperes and where $k=1.38\times10^{-23}$J/°K (Boltzmann's constant), T is the absolute temperature in °K, B is the bandwidth in Hz and R is the resistance in ohms.

Therefore, when an application requires the amplification of a very low signal from a photo diode, the prior art resistive feedback amplifier 100 sometimes proves unuseful due to excessive noise, for example.

FIG. 2 presents a circuit 200 of the art, designed to avoid this thermal noise problem. In FIG. 2, the photo diode 130 remains coupled across the inputs of the op amp 120. In place of the resistive element R 150, a capacitor 220, coupled between the negative input and the output 210 of the op amp 120, serves as the feedback element. The source of a field-effect transistor (FET) 230 is coupled to the output 210 of the op amp 120 while the drain is coupled to the negative input of the op amp 120. The gate of the FET 230 serves as a Reset signal 240.

The use of the capacitor 220 as the feedback element eliminates the noise problem of the circuit 100.

The output from an integrator such as the circuit 200 is given in equation (4) below:

$$V_{out} = -i\frac{t}{C} \qquad 4$$

where i is the input signal from a signal source (such as photo diode 130) in amperes, t is the time from reset to reading in seconds and C is the feedback capacitance (of capacitor 220, for example) in farads.

FIG. 3 illustrates the timing of the operation of the circuit 200 of FIG. 2. A control circuit (not shown) typically resets the integrator 200 (by means of the Reset signal 240) at twice the rate of the signal bandwidth. Just prior to each of these resets, the control circuit reads the out signal 210 and extracts the true signal.

The use of the semiconductor switch 230, however, creates its own problems in the circuit 200. The charge transfer itself from the Reset signal 240 during the resetting of the integrator 200 induces noise. To avoid this problem, the control circuit reads the out signal 210 right after releasing the reset switch 240. The control circuit then subtracts this reading from the final reading.

The noise of the photo diode 130 and op amp 120 nonetheless affect the two-reading scheme used with the circuit 200 up to the bandwidth of the system. The system bandwidth has to be much higher than the signal bandwidth in order not to distort the integration curves.

Accordingly, there is a need for a circuit for an improved detector of low levels of light without the thermal noise and other problems described above. These and other goals of the invention will be readily apparent to one of ordinary skill in the art on the reading of the background above and the invention description below.

SUMMARY OF THE INVENTION

Herein is disclosed a method and apparatus for measuring very low power signals such as low power light signals, including integrating a signal from a signal source such as a photo diode, an avalanche photo diode, a photomultiplier tube or the like, digitally sampling the integrator output multiple times during each integration period, fitting a curve to the multiple digitized readings to calculate the integration slope for each integration period and determining the original signal from the calculated integration slope.

According to an aspect of the invention, an apparatus for use in measuring low power signals is provided, the apparatus comprising: an integrator, wherein the integrator receives an original low power signal from a signal source and integrates the signal over multiple integration periods; an analog-to-digital converter having an analog input coupled to an output of the integrator, wherein the converter digitally samples the integrator output more than two times during each integration period to obtain multiple digital samples; and a processor coupled to a digital output of the analog-to-digital converter, wherein the processor determines the original low power signal from the multiple digital samples.

According to another aspect of the invention, an apparatus for use in measuring low power light-based signals in a detection region in a first one of at least two intersecting microchannels is provided, the apparatus comprising: a photo diode located proximal the detection region which detects a low power light-based signal in the detection region and outputs a photo diode signal; an integrator having an input coupled to an output of the photo diode, wherein the integrator receives and integrates the photo diode signal over multiple integration periods; a low pass filter having an input coupled to an output of the integrator, wherein the low pass filter operates to filter out frequencies above a predetermined level in the integrator output signal; an analog-to-digital converter having an analog input coupled to an output of the low pass filter, wherein the converter digitally samples the filtered integrator output signal more than two times during each integration period to obtain multiple digital samples; and a processor coupled to a digital output of the analog-to-digital converter, wherein the processor calculates the integration slope for each integration period using the multiple digital samples, and wherein the processor determines the original low power signal from the calculated integration slopes.

According to yet another aspect of the invention, a method is provided for measuring low power signals, the method comprising the steps of: receiving an original signal from a signal source; integrating over multiple integration periods the original signal with an integrator to produce an integrator output signal; digitally sampling the integrator output signal more than two times during each integration period with an analog-to-digital converter coupled to the integrator to obtain multiple digital samples; and determining the original signal from the multiple digital samples.

According to a further aspect of the invention, a method is provided for measuring low power light-based signals in a detection region in a first one of at least two intersecting microchannels, the method comprising the steps of: locating a photo diode proximal the detection region, wherein the photo diode detects an original low power light-based signal in the detection region and outputs a photo diode signal; integrating the photo diode signal over multiple integration periods to produce an integrator output signal using an integrator having an input coupled to an output of the photo diode; filtering out frequencies above a predetermined level in the integrator output signal using a low pass filter having an input coupled to an output of the integrator; digitally sampling the filtered integrator output signal more than two times during each integration period with an analog-to-digital converter having an analog input coupled to an output of the low pass filter to obtain multiple digital samples; calculating the integration slope for each integration period using the multiple digital samples; and determining the original low power signal from the calculated integration slopes.

According to yet a further aspect of the invention, a system is provided for measuring low power signals, the system comprising: means for detecting an original low power signal; means for integrating the original low power signal over multiple integration intervals to produce an integration output signal; digital sampling means for digitally sampling the integration output signal more than two times during each integration interval to obtain multiple digital samples; and a processor coupled to the digital sampling means, the processor including: means for calculating the integration slope for each integration interval using the multiple digital samples; and means for determining the original low power signal from the calculated integration slopes.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
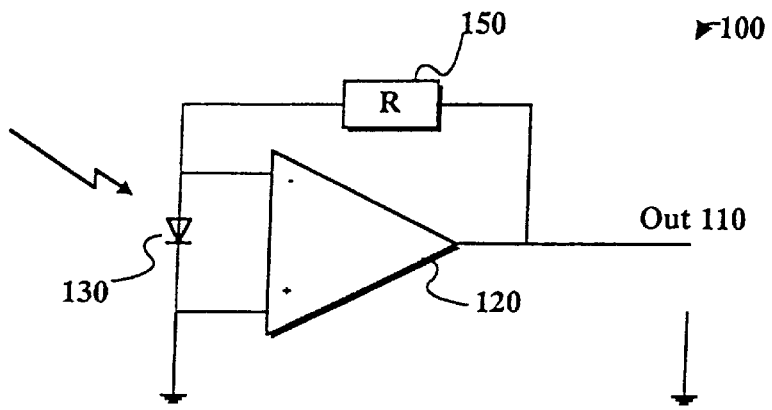
FIG. 1 illustrates a circuit of the prior art for amplifying a signal from a photo diode.
Figure 2:
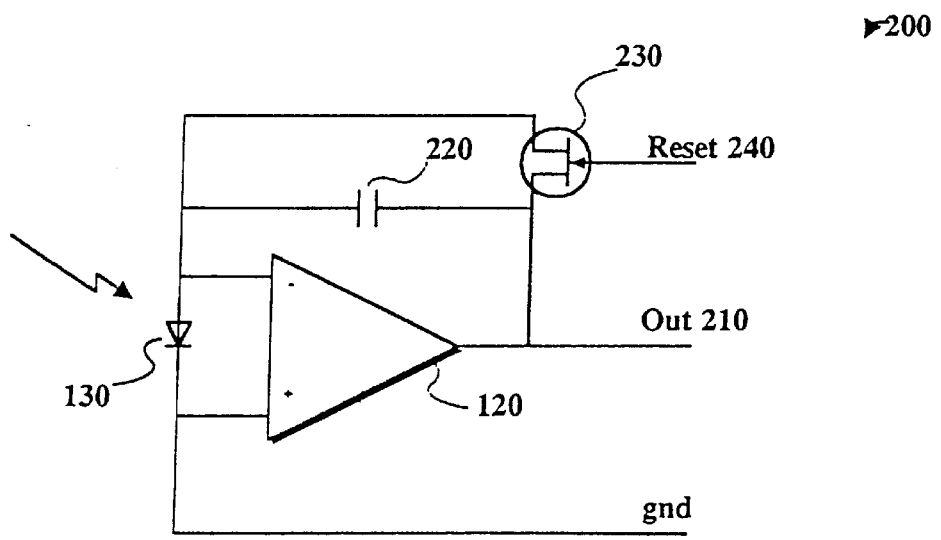
FIG. 2 presents a circuit of the prior art, designed to avoid the thermal noise problem.
Figure 3:
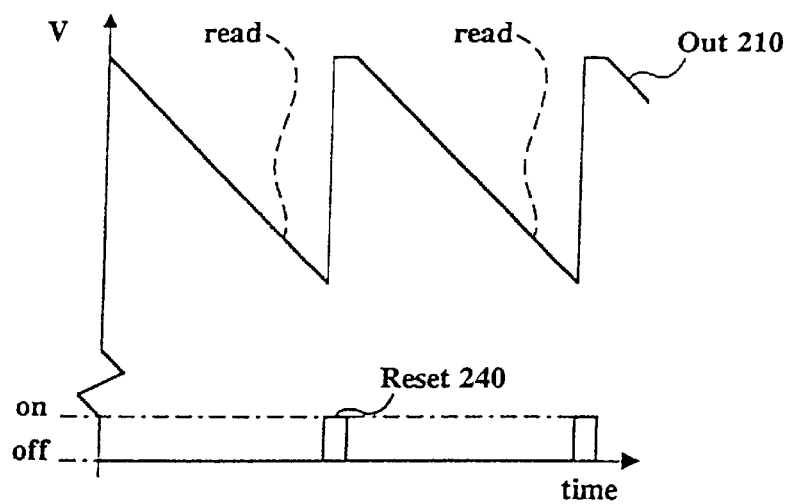
FIG. 3 illustrates the timing of the operation of the circuit of FIG. 2.

In preferred aspects, the method and apparatus of the instant invention are used in the detection of light-based signals from analytical systems employing optical detection in microscale fluidic channels. Examples include, e.g., fused silica capillary systems, i.e., CE, as well as microfluidic devices and systems that incorporate microscale channels such as microfluidic channels. Such systems are generally described in U.S. Pat. Application Ser. Nos. 08/845,754 (Attorney Docket No. 100/01000, filed Apr. 25, 1997), 08/881,696 (Attorney Docket No. 17646-000420, filed Jun. 24, 1997), a continuation-in-part of U.S. Pat. Application Ser. No. 08/761,575 (filed Dec. 6, 1996), and 60/049,013 (Attorney Docket No. 17646-003600), filed Jun. 9, 1997. (The disclosure of each of these applications is hereby incorporated by reference in its entirety for all purposes.)

A "microfluidic" channel is a channel (groove, depression, tube, etc.) which is adapted to handle small volumes of fluid. In a typical embodiment, the channel is a tube, channel or conduit having at least one subsection with at least one cross-sectional dimension of between about 0.1 $\mu$m and 500 $\mu$m, and typically less than 100 $\mu$m; ordinarily, the channel is closed over a significant portion of its length, having top, bottom and side surfaces. In operation, materials that are being analyzed, e.g., subjected to optical analysis for light based signals, in these microscale fluidic systems, are transported along the microscale fluid channels, past a detection point, where a detectable signal indicative of the presence or absence of some material or condition, is measured. In the case of light based detection systems, the signals within these channels typically result from the presence of light emitting substances therein, e.g., fluorescent or chemiluminescent materials, that are used as indicators of the presence of absence of some material or condition. Because microscale channels have extremely small dimensions, the amount of signal typically available for detection within such channels is also extremely small. For example, in the microfluidic systems for which the present invention is particularly useful, the power levels of signals from a detection region in a microfluidic channel are typically on the order of about 0.1 pW to about 10 pW.

As noted above, in microscale analytical systems, a signal bearing material is transported along the microscale channel and past a detection point. Typically, transporting materials within these systems may be carried out by any of a variety of methods. For example, such material transport is optionally carried out through the application of pressures to the materials within the channels, through the incorporation of microscale mechanical pumps, or through the application of electric fields, to move materials through the channels.

In preferred aspects, the above microfluidic systems use electrokinetic transport systems for moving material within the microfluidic channels. As used herein, "electrokinetic material transport systems" include systems which transport and direct materials within an interconnected channel and/or chamber containing structure, through the application of electrical fields to the materials, thereby causing material movement through and among the channel and/or chambers (i.e., cations will move toward the negative electrode, while anions will move toward the positive electrode). Such electrokinetic material transport and direction systems include those systems that rely upon the electrophoretic mobility of charged species within the electric field applied to the structure. Such systems are more particularly referred to as electrophoretic material transport systems. Other electrokinetic material direction and transport systems rely upon the electroosmotic flow of fluid and material within a channel or chamber structure which results from the application of an electric field across such structures. In brief, when a fluid is placed into a channel which has a surface bearing charged functional groups, e.g., hydroxyl groups in etched glass channels or glass microcapillaries, those groups can ionize. In the case of hydroxyl functional groups, this ionization (e.g., at neutral pH), results in the release of protons from the surface and into the fluid, creating a concentration of protons at near the fluid/surface interface, or a positively charged sheath surrounding the bulk fluid in the channel. Application of a voltage gradient across the length of the channel will cause the proton sheath to move in the direction of the voltage drop (i.e., toward the negative electrode).

Figure 7:
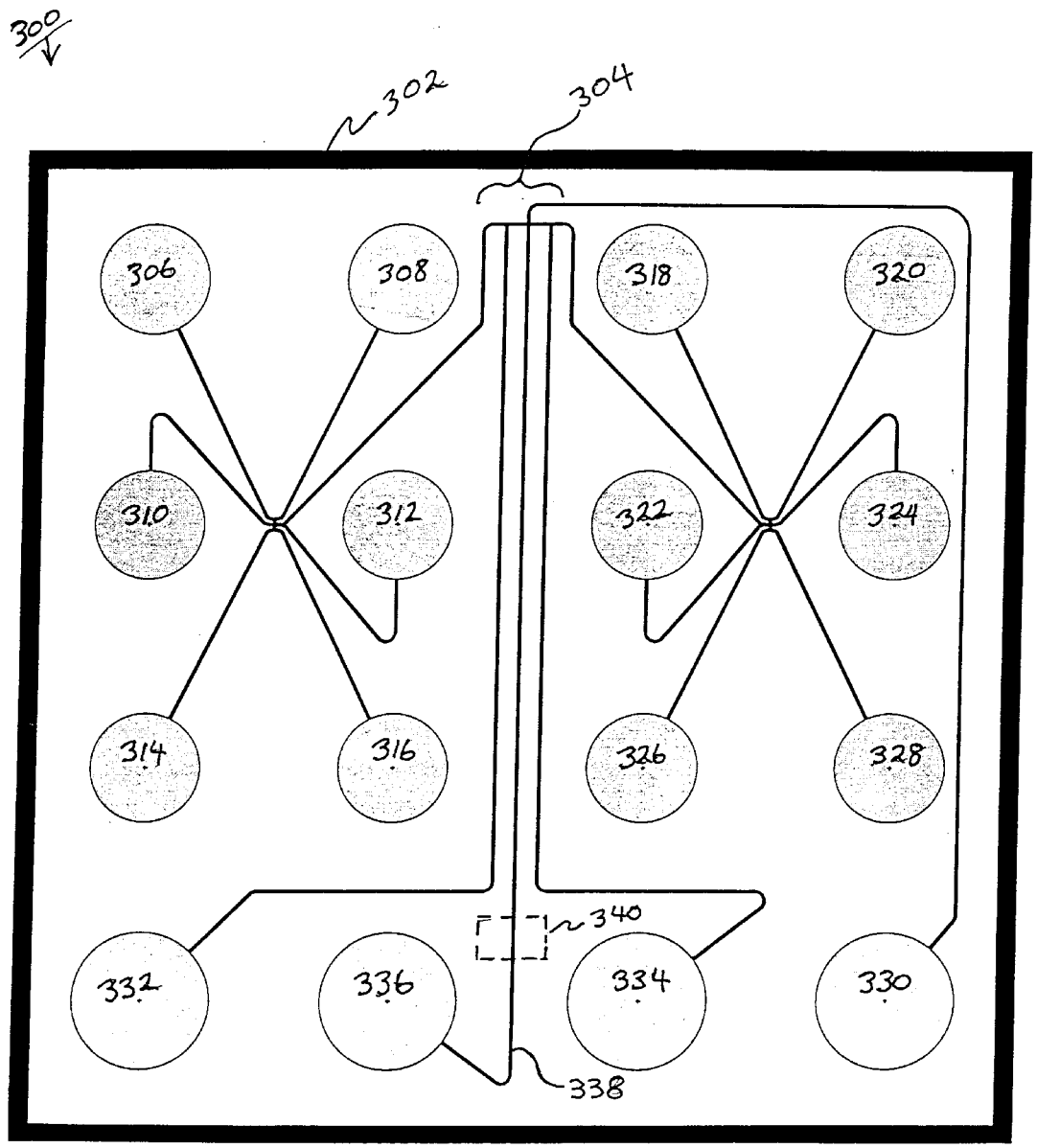
FIG. 7 illustrates an example of a microfluidic device for use with certain aspects of the present invention.

FIG. 7 depicts an example of a microfluidic device for use with certain aspects of the present invention. As shown, the device 300 includes a body structure 302 which has an integrated channel network 304 disposed therein. The body structure 302 includes a plurality of reservoirs 306–328, disposed therein, for holding reagents, sample materials, and the like. Also included is buffer reservoir 330, as well as waste reservoirs 332, 334 and 336. The reagents, samples, etc. are transported from their respective reservoirs, either separately or together with other reagents from other reservoirs into a main channel 338, and along main channel 338 toward waste reservoir 336, past detection zone or window 340. Detection window 340 is typically transparent, and may be comprised of a transparent region of the body structure, or a separate transparent window fabricated into the body structure. Typically, the body structure is itself fabricated from a transparent material, e.g., glass or transparent polymers, thereby obviating the need for a separate transparent region to define the detection window. Microfluidic devices of the sort described above are useful in performing a variety of analyses, such as electrophoretic separation of macromolecules, e.g., nucleic acids, proteins, etc. (see U.S. Application Ser. No. 08/845,754, filed Apr. 25, 1997, and previously incorporated herein by reference), high throughput screening assays, e.g., in pharmaceutical discovery, and diagnostics, e.g., immunoassays (see, e.g., Published International Application No. WO 98/00231).

Figure 4:
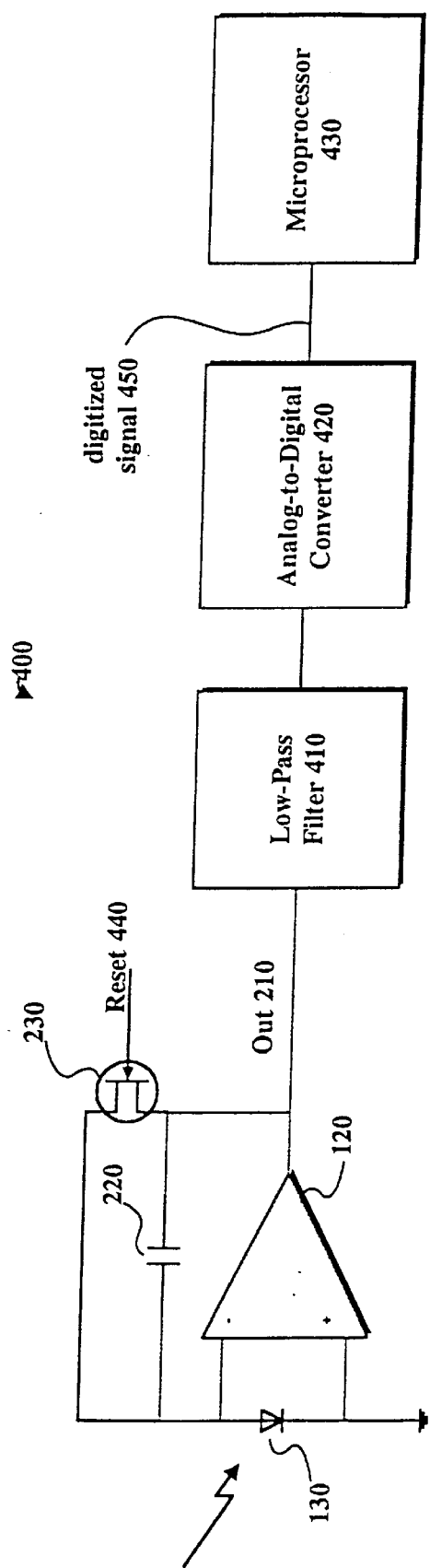
FIG. 4 illustrates a circuit 400 according to the invention.

In one embodiment, a signal source is located proximal detection window 340 for detecting low power, light-based signals from the detection region. The signal source is optionally selected from a number of different types of light detectors, i.e., photo diodes, avalanche photo diodes, photomultiplier tubes (PMTs) and the like. In preferred aspects, a photo diode is used. FIG. 4 illustrates a circuit 400 for amplifying a signal from a photo diode 130 according to the invention. In FIG. 4, the photo diode 130 is coupled across the inputs of an op amp 120. A capacitor 220, coupled between the negative input and the output 210 of the op amp 120, serves as the feedback element. The source of a field-effect transistor (FET) 230 is coupled to the output 210 of the op amp 120 while the drain is coupled to the negative input of the op amp 120. The gate of the FET 230 is connected to Reset signal 440.

The input of a low-pass filter 410 is coupled to the output signal 210. The output of the low-pass filter 410 is coupled to the analog input of an analog-to-digital converter 420. Finally, a microprocessor 430 receives as input the digitized output signal 450 of the analog-to-digital converter 420.

Figure 6:
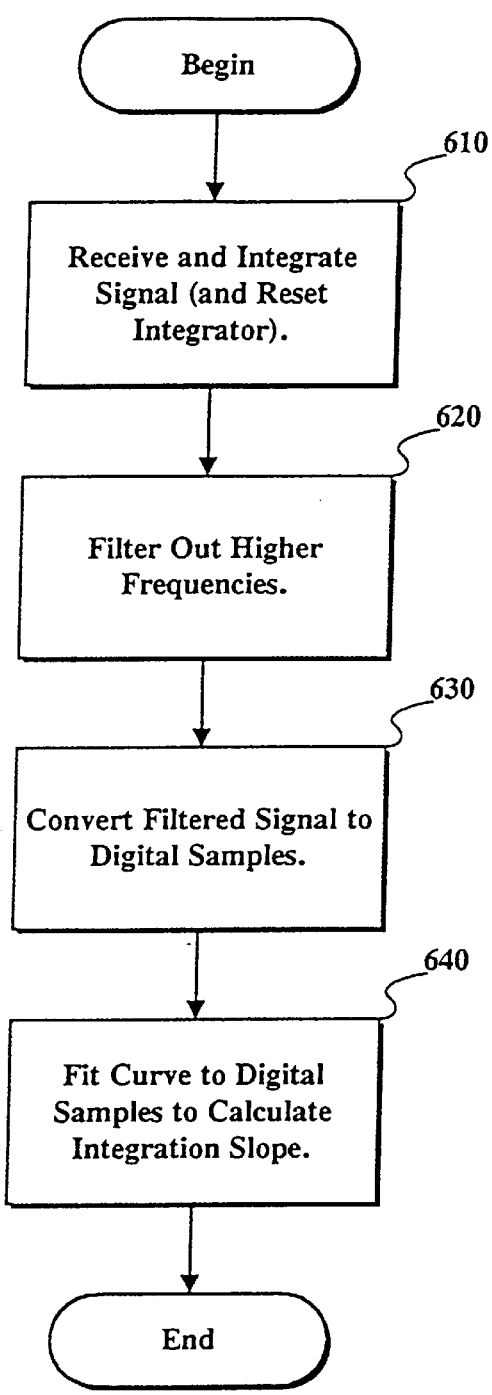
FIG. 6 illustrates the overall operation of the circuit of FIG. 4.

FIG. 6 illustrates the overall operation of the circuit 400. The circuit 400 receives and integrates a signal from a photo diode and resets the integrator, step 610. The circuit 400 then filters out the higher frequencies in the integrated signal, step 620. Next, the circuit 400 converts the analog filtered and integrated signal to digital samples, step 630. Finally, the circuit 400 calculates the integration slope for the photo diode signal by fitting a curve to the digitized samples, step 640. With the calculated slopes, the circuit 400 is better able to determine the original noise-less signal from the photo diode.

Figure 5:
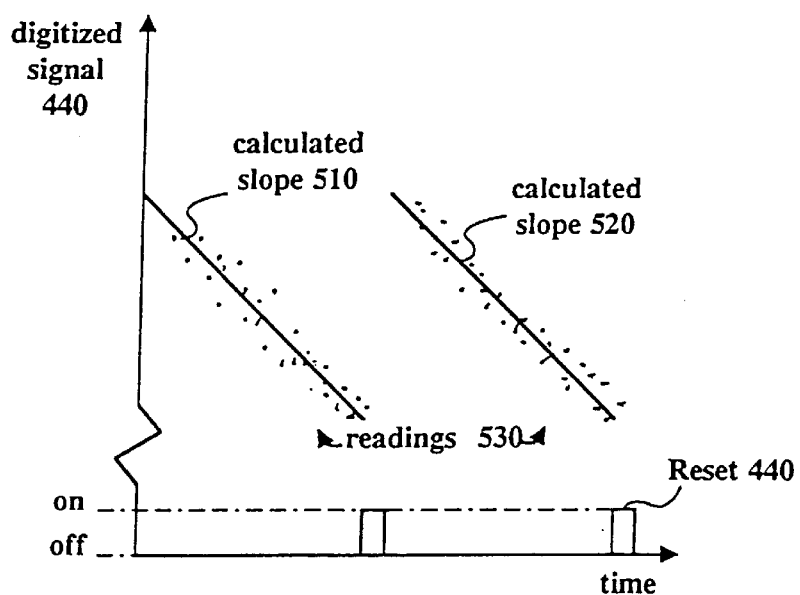
FIG. 5 illustrates the timing of the operation of the circuit 400 of FIG. 4.

FIG. 5 illustrates the timing of operation of the circuit 400 of FIG. 4. In contrast to the prior art circuit 200 which just takes two readings for each integration period, the circuit 400 takes many readings 530 for each integration period. In preferred aspects, analog-to-digital converter 420 samples the integrator output more than two times, preferably more than ten times, still more preferably more than one-hundred times, in many cases more that five hundred and even more than one-thousand times.

Also in contrast to the prior art circuit 200, the circuit 400 applies a more sophisticated curve-calculation routine to the per-period sample readings to generate the per-period calculated slopes 510 and 520. The curve calculation filters away overlying noise. In this way, the circuit 400 decreases the noise contribution from the photo diode 130 and the op amp 120 near to what is included in the signal bandwidth.

The frequency of the Reset signal 440, $f_{Reset}$, is fast enough to allow detection of the fastest signal necessary, $f_{Signal}$. In one embodiment, $f_{Reset}$ is approximately twice $f_{Signal}$.

The frequency of the low-pass filter 410, $f_{Low-Pass}$, is fast enough that the integration curves do not become significantly disturbed. $f_{Low-Pass}$ is dependent on signal distortion specifications. In one embodiment, $f_{Low-pass}$ is approximately ten times $f_{Reset}$.

To best filter noise, in one embodiment, the sample frequency, $f_{sample}$, is at least twice $f_{Low-pass}$.

The microprocessor 430 uses any of the numerous curve-fitting algorithms known in the art to calculate the slope of each integration period. Least-squares curve fitting is but one example of these algorithms. Any curve-fitting algorithm that filters away overlaid noise can be used. For example, the curve-fitting algorithm can be: $0.5 \times f_{Reset} \times$ (First Readings–Last Readings), where "First Readings" are the first half of the samples taken within an integration period and "Last Readings" are the second half of the samples taken within an integration period.

The circuit 400 filters both voltage noise and current noise from the op amp 120 and photo diode 130 close to the theoretical value included in the signal band. Noise can be almost totally ignored.

The noise in the measurement is affected by the amount of noise at the negative input of the integrating op amp 120.

Any component will generate noise as described in equations (2) and (3) above. Therefore, in a preferred embodiment, all components connected to the negative input of op amp 120 have very high resistance. Also, op amp 120 preferably has low noise parameters.

The embodiments described herein are by way of example and not limitation. Modifications to the invention as described will be readily apparent to one of ordinary skill in the art. For example, while the photo diode 130 is described as a signal source above, it is understood that any sensor giving voltage or current signals or any source of readings convertible to current or voltage readings can be the signal source. (Of course, if the signal source is a voltage output, a resistor converts it to a current output adaptable to the circuit described.) Still further, while a FET device 230 is described as the resetting mechanism, other devices which have high resistance when not asserting the Reset signal 440 can be used. For example, the resetting mechanism can be an opto-activated FET or opto-activated diode or relay or another kind of transistor.

Of course, the program text for such software as is herein disclosed can exist in its static form on a magnetic, optical or other disk, on magnetic tape or other medium requiring media movement for storage and/or retrieval, in ROM, in RAM or other integrated circuit, or in another data storage medium. That data storage medium may be integral to or insertable into a computer system.

What is claimed is:

1. An apparatus for use in measuring low power signals, the apparatus comprising:
    an integrator, wherein the integrator receives an original low power signal from a signal source and integrates the signal over multiple integration periods;
    an analog-to-digital converter having an analog input coupled to an output of the integrator, wherein the converter digitally samples the integrator output more than two times during each integration period to obtain multiple digital samples; and
    a processor coupled to a digital output of the analog-to-digital converter, wherein the processor determines the original low power signal using the multiple digital samples.

2. The apparatus of claim 1, further comprising a low pass filter coupled between the integrator and the converter, wherein the low pass filter operates to filter out frequencies above a selected level in the integrator output.

3. The apparatus of claim 1, further comprising a reset mechanism coupled to the integrator, wherein the reset mechanism generates a reset signal, and wherein the integrator starts each integration period in response to the reset signal.

4. The apparatus of claim 3, wherein the reset signal has a reset frequency, wherein the original low power signal has a useful signal bandwidth, and wherein the reset frequency is approximately twice the useful signal bandwidth.

5. The apparatus of claim 3, further comprising a low pass filter coupled between the integrator and the converter, wherein the low pass filter operates to filter out frequencies above a selected level in the integrator output.

6. The apparatus of claim 5, wherein the reset signal has a reset frequency, wherein the low pass filter operates at a specified frequency, and wherein the specified low pass filter frequency is approximately 10 times the reset frequency.

7. The apparatus of claim 3, wherein the reset mechanism includes one of a FET, a transistor, an opto-activated FET, an opto-activated diode and a relay.

8. The apparatus of claim 1, wherein the processor calculates an integration slope for each integration period using the multiple digital samples, and wherein the processor determines the original low power signal from the calculated integration slopes.

9. The apparatus of claim 8, wherein the processor calculates the integration slopes using least squares curve fitting to fit a line to the digital samples of the integrator output for each integration period.

10. The apparatus of claim 1, wherein the signal source is a photo diode which detects low power light-based signals.

11. The apparatus of claim 1, wherein the signal source is a detector which detects low power light-based signals, wherein the detector is selected from the group consisting of a photo diode, an avalanche photo diode and a photomultiplier tube.

12. The apparatus of claim 11, wherein the detector is located proximal a detection region in a first one of at least two intersecting microchannels, and wherein the detector detects light-based signals from the detection region and outputs the original low power signal.

13. An apparatus for use in measuring low power light-based signals in a detection region in a first one of at least two intersecting microchannels, the apparatus comprising:
    a photo diode located proximal the detection region which detects a low power light-based signal in the detection region and outputs a photo diode signal;
    an integrator having an input coupled to an output of the photo diode, wherein the integrator receives and integrates the photo diode signal over multiple integration periods to produce an integrator output signal;
    a low pass filter having an input coupled to an output of the integrator, wherein the low pass filter operates to filter out frequencies above a selected level in the integrator output signal;
    an analog-to-digital converter having an analog input coupled to an output of the low pass filter, wherein the converter digitally samples the filtered integrator output signal more than two times during each integration period to obtain multiple digital samples; and
    a processor coupled to a digital output of the analog-to-digital converter, wherein the processor calculates the integration slope for each integration period using the multiple digital samples, and wherein the processor determines the original low power signal from the calculated integration slopes.

14. A method of measuring low power signals, comprising the steps of:
    receiving an original signal from a signal source;
    integrating over multiple integration periods the original signal with an integrator to produce an integrator output signal;
    digitally sampling the integrator output signal more than two times during each integration period of the integrator output signal with an analog-to-digital converter coupled to the integrator to obtain multiple digital samples; and
    determining the original signal from the multiple digital samples.

15. The method of claim 14, further comprising the step of filtering out frequencies above a predetermined level in the integrator output signal using a low pass filter coupled between the integrator and the converter to produce a filtered signal, wherein the converter digitally samples the filtered signal.

16. The method of claim 14, further comprising the step of generating a reset signal having a reset frequency with a reset mechanism coupled to the integrator, wherein the integrator starts each integration period in response to the reset signal.

17. The method of claim 16, wherein the reset mechanism includes one of a FET, a transistor, an opto-activated FET, an opto-activated diode and a relay.

18. The method of claim 16, further comprising the step of filtering out frequencies above a selected level in the integrator output signal using a low pass filter coupled between the integrator and the analog-to-digital converter to produce a filtered signal, wherein the filter operates at a specific frequency, and wherein the specified frequency is approximately 10 times the reset frequency.

19. The method of claim 14, wherein the determining step includes the steps of:

calculating the integration slope for each integration period using the multiple digital samples; and determining the original signal from the calculated integration slopes.

20. The method of claim 19, wherein the calculating step includes the steps of fitting a line to the digital samples using a least squares method, and using the slope of the line to determine the original signal.

21. The method of claim 14, wherein the original signal is a low power light-based signal, wherein the receiving step includes the step of detecting the original signal with a photo diode coupled to the integrator which outputs a photo diode signal, and wherein the photodiode signal is integrated to produce the integrator output signal.

22. The method of claim 14, wherein the original signal is a low power light-based signal, wherein the receiving step includes the step of detecting the original signal with a detector coupled to the integrator which outputs a detector signal, wherein the detector is selected from the group consisting of a photo diode, an avalanche photo diode and a photomultiplier tube, and wherein the detector signal is integrated to produce the integrator output signal.

23. The method of claim 22, further including the step of locating the detector proximal a detection region in a first one of at least two intersecting microchannels, wherein the detector detects light-based signals from the detection region.

24. A method of measuring low power light-based signals in a detection region in a first one of at least two intersecting microchannels, the method comprising the steps of:

locating a photo diode proximal the detection region, wherein the photo diode detects an original low power light-based signal in the detection region and outputs a photo diode signal;

integrating the photo diode signal over multiple integration periods to produce an integrator output signal using an integrator having an input coupled to an output of the photo diode;

filtering out frequencies above a selected level in the integrator output signal using a low pass filter having an input coupled to an output of the integrator;

digitally sampling the filtered integrator output signal more than two times during each integration period with an analog-to-digital converter having an analog input coupled to an output of the low pass filter to obtain multiple digital samples;

calculating the integration slope for each integration period using the multiple digital samples; and determining the original low power signal from the calculated integration slopes.

25. A system for measuring low power signals, the system comprising:

means for detecting an original low power signal;

means for integrating the original low power signal over multiple integration intervals to produce an integration output signal;

digital sampling means for digitally sampling the integration output signal more than two times during each integration interval to obtain multiple digital samples; and a processor coupled to the digital sampling means, the processor including:

means for calculating the integration slope for each integration interval using the multiple digital samples; and means for determining the original low power signal from the calculated integration slopes.

26. The system of claim 25, further comprising means, coupled between the digital sampling means and the integrating means, for filtering out frequencies above a selected level in the integration output signal.

27. The system of claim 25, further comprising means, coupled to the integration means, for generating a reset signal, wherein the integration means starts each integration interval in response to the reset signal.

28. The system of claim 25, wherein the means for calculating includes curve fitting means for fitting a line to the digital samples for each integration interval.

29. The system of claim 25, wherein the detection means includes a photo diode which detects low power light-based signals.

30. The system of claim 25, wherein the detection means includes a detector selected from the group consisting of a photo diode, an avalanche photo diode and a photomultiplier tube.

31. The system of claim 30, wherein the detector is located proximal a detection region in a first one of at least two intersecting microchannels, and wherein the detector detects light-based signals from the detection region.

* * * * *